2 Sheets—Sheet I.

B. DENSMORE.

SECTIONAL STEAM-GENERATOR.

No. 6,893. Reissued Feb. 1, 1876.

Witnesses
John Becker
Fred. Haynes

Byron Densmore
by his Attorneys
Brown & Allen

N. PETERS, PHOTO-LITHOGRAPHER, WASHINGTON, D. C.

2 Sheets—Sheet 2.

B. DENSMORE.

SECTIONAL STEAM-GENERATOR.

No. 6,893. Reissued Feb. 1, 1876.

Witnesses
John Becker
Jas Haynes

Byron Densmore
by his Attorneys
Brown & Allen.

N. PETERS, PHOTO-LITHOGRAPHER, WASHINGTON, D. C.

UNITED STATES PATENT OFFICE.

BYRON DENSMORE, OF BROOKLYN, NEW YORK.

IMPROVEMENT IN SECTIONAL STEAM-GENERATORS.

Specification forming part of Letters Patent No. 108,333, dated October 18, 1870; antedated October 4, 1870; reissue No. 6,893, dated February 1, 1876; application filed December 15, 1875.

*To all whom it may concern:*

Be it known that I, BYRON DENSMORE, of the city of Brooklyn, in the county of Kings and State of New York, formerly of New York city, in said State, have invented certain new and useful Improvements in Steam-Boilers; and I do hereby declare that the following is a full, clear, and exact description of the same, reference being had to the accompanying drawing, which forms part of this specification.

The main objects of my invention are to prevent priming, to produce a more perfect absorption of the heat by the water, to prevent leakage at the connections, and to economize space and brick-work.

The invention consists in a combination of hollow walls or exterior and upright steam-generating chambers, having a free circulation for the water up and down through them, also a ready escape for the steam from their upper surfaces, and reversely-inclined tubes arranged to independently and directly connect at their opposite ends with the same walls or upright chambers. By this combination the steam generated in each reversely-inclined connecting-tube is at liberty to escape up through the chamber or hollow wall with which it connects at its higher end, without passing back and forth through the other tubes, and an active circulation of the water, as well among the tubes nearest to the fire as among or through the tubes more distant therefrom, is obtained.

Figure 2:
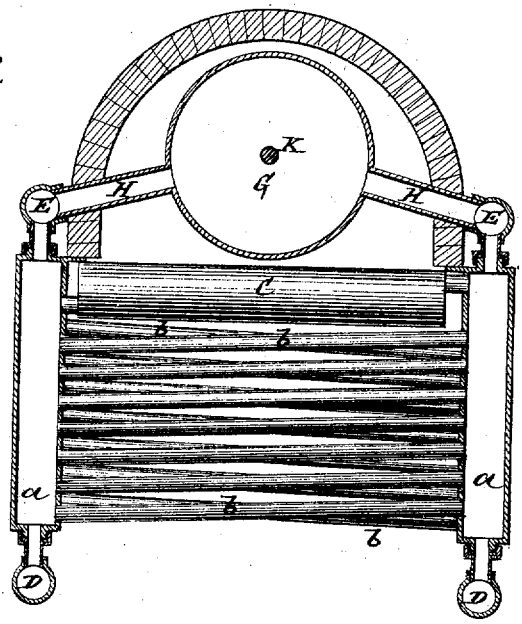
Figure 1:
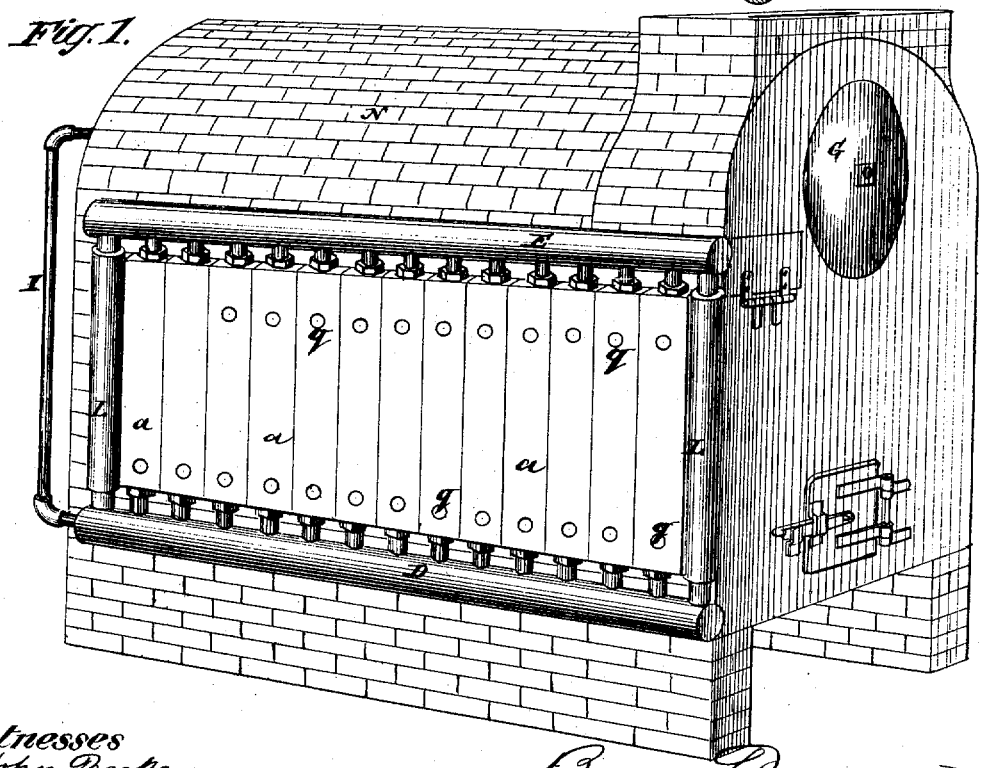
Figure 4:
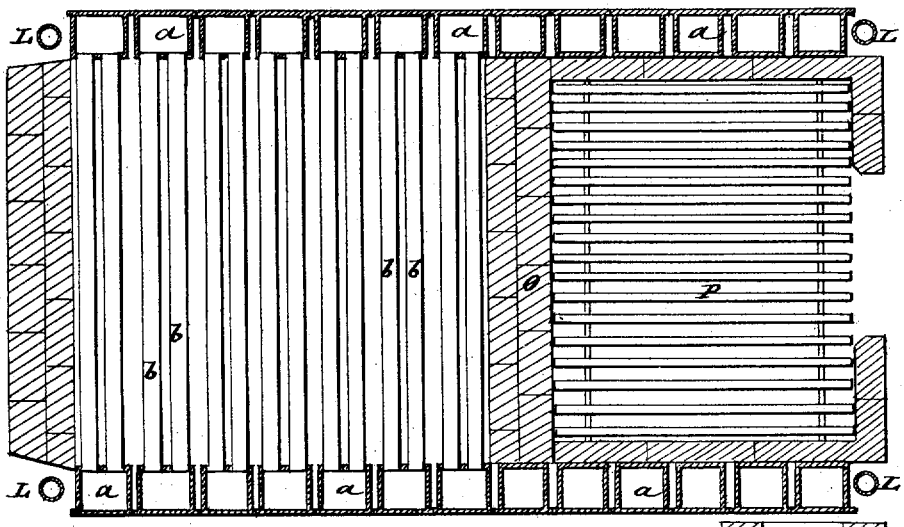
Figure 3:
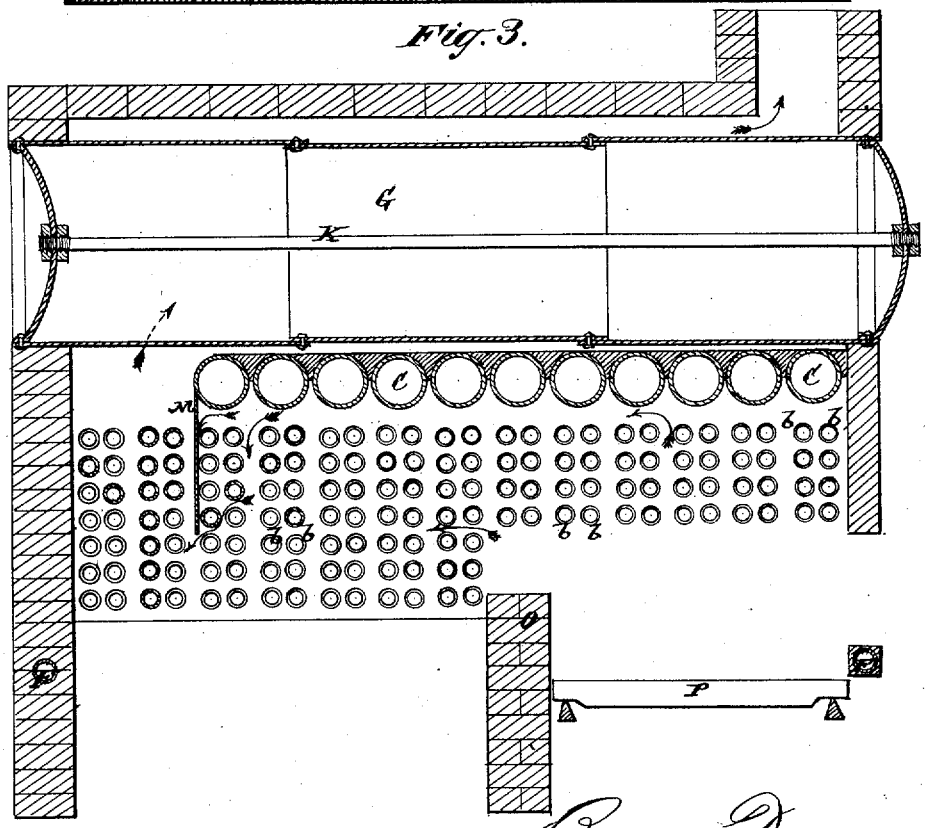

Figure 1 is a perspective view of a steam-boiler constructed in accordance with my invention, and showing the hollow walls applied to the sides of the boiler, and as composed of a series of upright sections. Fig. 2 is a transverse sectional elevation of the same; Fig. 3, a longitudinal sectional elevation thereof; and Fig. 4, a horizontal section of the same.

The hollow walls, here shown as applied to the sides of the boiler, and will therefore in this specification be described as the side walls, are here represented as built up of upright sections *a a*, which may be made of cast-iron, and which, when two-inch connecting-tubes are used, may be about six and one-half inches square, and from three to three and one-half feet high, and so that the water-space in them is about five and one-quarter inches square. At least, these dimensions and others hereinafter named, will serve to illustrate the construction as well as any other.

The front sides are widened on both edges, so that, when the dimensions hereinbefore specified are observed, each section fills a space of about seven and one-eighth inches in width.

When the hollow walls of the boiler are thus constructed in sections the adjacent sections touch each other only at the outer edges, leaving a space of, say, five-eighths of an inch between the sections.

The tubes *b* are placed transversely—that is, in relation to the opposite walls or sections *a a*—and are set slightly inclined from a horizontal position. There are two rows, up and down, in each section, inclining in reverse directions, which gives an active circulation to the water in the tubes, and causes the water to keep at the same level in the sections or hollow sides of the boiler at each end of the tubes. The tubes *b* may be screwed into the section with right and left hand screws of fine lead and very little taper.

Over the tubes *b*, in each section, is placed a larger and horizontally-arranged tube, C, having heads welded into the ends, and being connected to the sections by suitable nipples, one of the nipples being to the right, and the other to the left. One of these nipples is placed as low down on the tube for the admission of water, and the other as high up for the exit of the steam, as is practicable. The sections *a* have a rounded projection or boss on each end one and one-quarter inch long, more or less, and of sufficient diameter to screw for a union-nut of about two inches. There is a hole of two inches diameter, more or less, in these bosses into the water-space. The ends of the bosses are faced off in the lathe when they are screwed. D D and E E are upper and lower longitudinal pipes, which may be of either wrought or cast iron. Cast-iron, however, is thought preferable. They may be of about four inches inside diameter, and, if made of cast-iron, of about five and one-quarter inches diameter outside. The sections *a a* are connected to these pipes D E by means of unions, one part of each union screwing into the pipes, and the union-nuts screwing onto the bosses on the ends of the sections. These unions may be packed with the metallic spring-gasket patented by me December, 1868. The pipes D D are connected together at each end by transverse pipes F F, and the pipes E E are connected at each end to the steam-drum G by inclined pipes H H. K is a stay-rod from head to head of the drum. The corner pipes L L L L are three inches, more or less, in diameter, and may be of wrought-iron, with a right and left hand screw, or may be of cast-iron, and connected to the pipes D D and E E by two right and left nipples, or by one right nipple and one right and left. M is a plate of iron that is hung by its upper edge, touching the rear large tube C, and extending down a distance of four tubes, more or less, between the small tubes *b*, to force the draft downward, and to equalize the heat among the tubes. I is a pipe connecting the steam-drum G and one of the pipes D. It enters the steam-drum a few inches from the bottom of it, so that, when the water rises that high in the drum, it will flow to the bottom of the boiler. The spaces between the large tubes are stopped with fire-mortar.

N is a brick arch, resting on flanges projecting out at the top of the side walls or sections *a* for that purpose. The front of the boiler may be of light cast or wrought iron, lined with fire-brick. The foundation-wall I propose to make eight inches thick from the front to the bridge-wall O, and twelve inches thick from there to the rear end of the boiler, and a wall of about four inches thick carried up along the inside of the pipes D D, and made to lap onto the sections *a* to stop the opening between the sections and pipes back of the bridge-wall.

The top edges of the grates P may be placed about as high as the center of the pipes D D, and fire-bricks set on end between the grates and sections, the lower ends resting on the foundation-wall, and the upper end lapping up onto the lower ends of the sections, thus stopping the opening between the sections, and the pipes D D being held in their position by the grates.

The tubes C may be omitted in one, two, or three of the rear sections, according to the size of the boiler, for a flueway to the upper chamber of the boiler. The rear end of the boiler is stopped with brick-work. The arrows indicate the direction of the draft.

There are also plugs *q q q q*. The upper series of these plugs are placed on a level with the nipples that connect the large tubes C to the sections for convenience of cleaning out the large tubes, and the lower ones of which are for the convenience of cleaning out the lower ends of the sections.

There should be two blow-off cocks, on opposite corners of the boiler, so that the pipes D D may be blown out clear.

The circulation of the water in the small tubes is so rapid that they do not scale.

The water-line may be supposed to be through the center of the large tubes C, which gives a large evaporating-surface. This leaves a sufficient space above from the water-line to the tops of the side walls or sections *a a*, to provide for separation of the steam from the water before it passes through the small openings into the pipes E E. In these pipes, the steam flows from the center toward the ends. Here again the water and steam have a good opportunity to separate. At the ends, the steam passes up the pipes H into the steam-drum, and the water falls down the pipes L L L L. Hence in no case does much water get into the steam-drum.

I claim—

The combination, with the hollow walls or exterior and upright steam-generating chambers *a a*, of the reversely-inclined tubes *b b*, arranged to independently and directly connect at their opposite ends with the same walls or upright chambers, substantially as specified.

BYRON DENSMORE.

Witnesses:

HENRY T. BROWN,

E. R. BROWN.